US007856851B2

(12) United States Patent
Chiappetta et al.

(10) Patent No.: US 7,856,851 B2
(45) Date of Patent: Dec. 28, 2010

(54) PROCESS FOR BENDING A GLASS PANEL WITH A PLURALITY OF SUPPORTS

(75) Inventors: Serge Chiappetta, Machemont (FR); Guillaume Egele, Compiegne (FR)

(73) Assignee: Saint-Gobain Glass France, Courbevoie (FR)

( * ) Notice: Subject to any disclaimer, the term of this patent is extended or adjusted under 35 U.S.C. 154(b) by 170 days.

(21) Appl. No.: 10/557,419

(22) PCT Filed: May 17, 2004

(86) PCT No.: PCT/FR2004/050198

§ 371 (c)(1),
(2), (4) Date: Jul. 26, 2006

(87) PCT Pub. No.: WO2004/103922

PCT Pub. Date: Dec. 2, 2004

(65) Prior Publication Data

US 2007/0026238 A1 Feb. 1, 2007

(30) Foreign Application Priority Data

| May 19, 2003 | (FR) | ................................... | 03 05942 |
| Jul. 10, 2003 | (FR) | ................................... | 03 08452 |

(51) Int. Cl.
  *C03B 23/025* (2006.01)
  *C03B 23/023* (2006.01)
(52) U.S. Cl. .............................. 65/107; 65/106; 65/273; 65/290; 65/291
(58) Field of Classification Search .................. 65/106, 65/107, 273, 290, 291, 111
See application file for complete search history.

(56) References Cited

U.S. PATENT DOCUMENTS 3,003,286 A  10/1961  Richardson (Continued)

FOREIGN PATENT DOCUMENTS

EP  0 418 700  3/1991

(Continued)

OTHER PUBLICATIONS

Machine translation of WO 02064519 A1.*

*Primary Examiner*—Matthew J. Daniels
*Assistant Examiner*—Cynthia Szewczyk
(74) *Attorney, Agent, or Firm*—Oblon, Spivak, McClelland, Maier & Neustadt, L.L.P.

(57) ABSTRACT

A glazing element-bending process including first to fourth stages. The first stage bends the glazing element through gravitational depression on a first support providing it with a first central depression. The second stage continues the bending of the glazing element through gravitational depression on a second support, providing it with a second central depression more pronounced than the first and until such time as the whole periphery of the glazing element enters into contact with the second support, the glazing element being at a sufficiently high temperature to enable its central part to continue to sag following contact of the whole of the periphery. The third stage continues the bending of the glazing element through gravitational depression, providing it with a third central depression more pronounced than the second, the periphery being always in contact with the second support. The fourth stage halts the depression of the glazing element by cooling and gives it the desired final shape.

29 Claims, 7 Drawing Sheets

U.S. PATENT DOCUMENTS

| | | | |
|---|---|---|---|
| 3,086,376 A | * 4/1963 | Leflet, Jr. et al. | 65/288 |
| 3,880,635 A | * 4/1975 | Jack et al. | 65/106 |
| 5,146,282 A | 9/1992 | Guering et al. | |
| 5,167,689 A | 12/1992 | Weber | |
| 5,660,609 A | 8/1997 | Muller et al. | |
| 5,893,941 A | * 4/1999 | Nikander | 65/104 |
| 6,138,477 A | * 10/2000 | Morin | 65/107 |
| 6,158,247 A | * 12/2000 | Didelot | 65/106 |
| 2004/0129028 A1 | * 7/2004 | Balduin et al. | 65/106 |
| 2007/0157671 A1 | * 7/2007 | Thellier et al. | 65/106 |

FOREIGN PATENT DOCUMENTS

| | | |
|---|---|---|
| EP | 1 097 910 | 5/2001 |
| WO | WO 02064519 A1 * | 8/2002 |

* cited by examiner

PROCESS FOR BENDING A GLASS PANEL WITH A PLURALITY OF SUPPORTS

The invention relates to a process and device for gravitational bending of a glazing element on at least two supports. The glazing elements more especially concerned are those having high concavities in two orthogonal directions, that is to say in a first direction corresponding to the largest dimension of the glazing element, designated by longitudinal curvature or bending, and in a second direction corresponding to the smallest dimension of the glazing element, designated by transverse curvature or bending. In the case of a windscreen mounted on an automobile, generally larger in width than in height, the longitudinal curvature is the horizontal curvature and the transverse curvature is the vertical curvature. These two concavities along mutually orthogonal lines are particularly difficult to effect by gravity whilst preventing the following defects: a) an excessive depression of the glass between the edge and the centre of the glazing element, commonly referred to as "bath effect", b) a bending which is locally inverted in the corners relative to that which is desired, commonly referred to as "counter-bending", a defect deriving directly from the fact that each line of concavity is the antinomy of that which is orthogonal thereto, c) a marking of the glass as a consequence of its contact in the pasty state with the bending tools.

According to the invention, it has actually been discovered that a prolonged depression (=sagging) could be exerted well after the final peripheral shape of the glazing element has been lent it by contact with the last gravitational bending support given sufficient bending temperature, the said prolonged depression resulting in a simultaneous increase in camber and in cross-bending through deepening of the central part of the glazing element. This prolonged depression, made possible by a sufficiently high temperature, is controlled by cooling. It became clear, moreover, that the prolonged depression, combined with the use of a plurality of different bending supports, had a multiple effect: a) it allows higher concavities to be obtained without counter-bending, and, furthermore, b) this prolonged depression is generally accompanied by reduced marking of the glass arising from contact with the bending tools. This latter effect, in particular, is totally unpredictable, since higher temperatures generally imply for the person skilled in the art a more pronounced marking, owing to the softer glass surface offered to the bending tool. The use of a plurality of different support lines for the bending in the course of the gravitational depression of the glass, in combination with a prolonged depression, reduces the marking. Indeed, the maintenance of the glass at a sufficiently high temperature for its plastic flow seems to result in an elastic expansion of the skin of the glazing element, leading to a reduction in any marks created beforehand. Since, according to the invention, a bending is applied by depression on a first support, followed by depression on a second support, any marking emanating from the first support tends to be at least partially erased once the first support has been substituted by the second, and this precisely by virtue of the temperature necessary to effect the prolonged depression, the said prolonged depression itself being accompanied by continuation of the erasure.

According to the present application, "glazing element" is used to denote at least one sheet of glass, or even at least two sheets of glass placed one on top of the other. The invention relates not only to the bending of an individual sheet of glass, which is able to be subsequently toughened and is intended, for example, to serve as a rear window of an automotive vehicle, but also to the bending of at least two sheets of glass (generally two sheets of glass) which have to be subsequently assembled using an intermediate sheet of a polymer, such as polyvinyl butyral (PVB), in order to produce a laminated glazing element, especially a windscreen of an automotive vehicle. For this latter type of glazing element, the bending of sheets intended for the same glazing element is preferably realized by placing them one on top of the other, since this lends them exactly the same shapes. For the bending, an intermediate powder of silica or kieselguhr is generally introduced in a known manner between the two sheets to prevent them from sticking together. This powder is removed following cooling, whereafter they can proceed to be assembled using the intermediate sheet of PVB.

Figure 1:
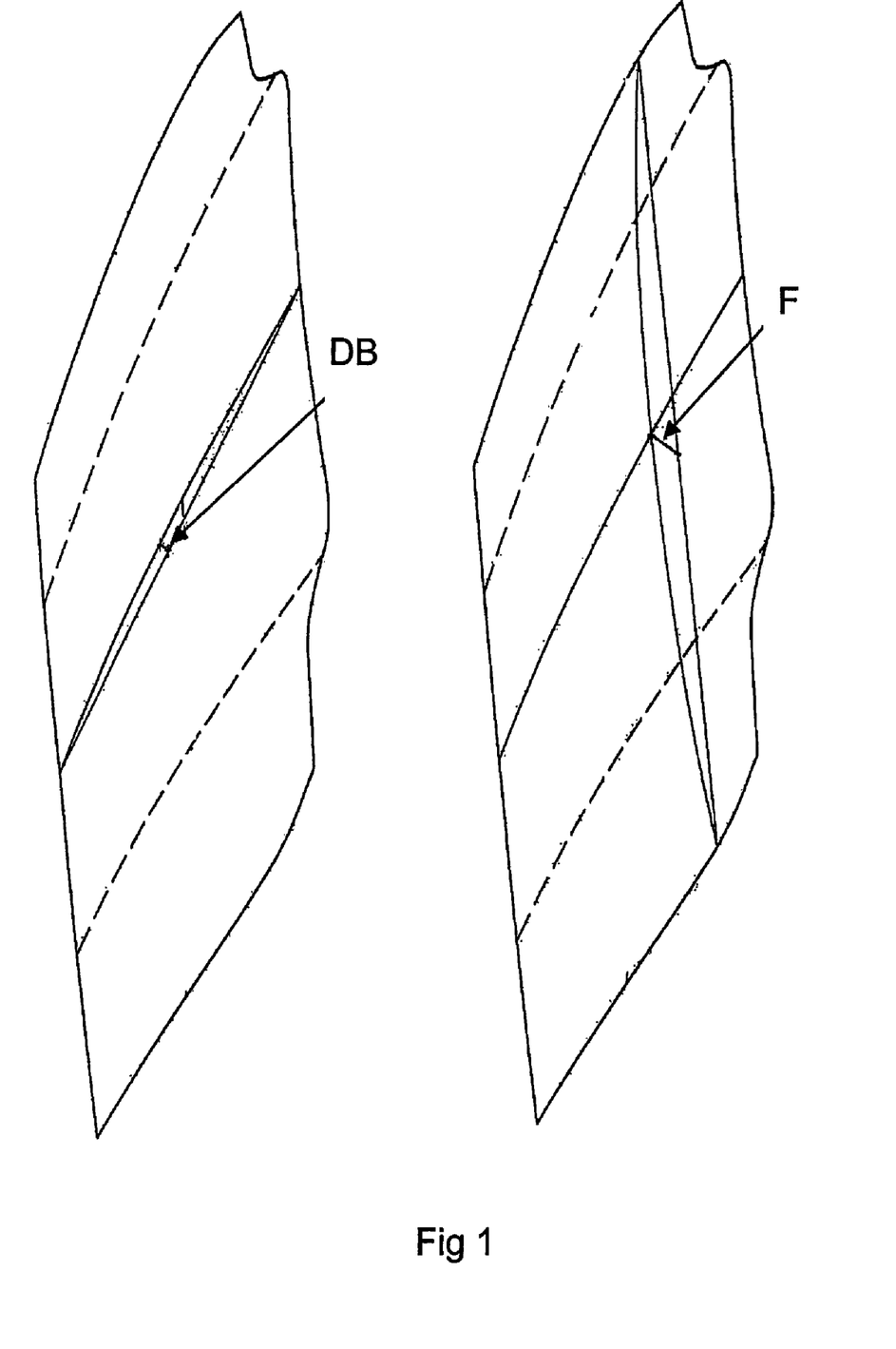

"Camber" is used to denote the depth of bending of the longest arc (generally the most pronounced bending), which is equal to the segment whose ends are defined by the middle of the said arc and the middle of the chord corresponding thereto (see the arrow F as represented in FIG. 1). Likewise, the curvature in the direction of the longest arc is referred to as the "longitudinal curvature". The bending in a direction orthogonal to the previous one, referred to as "cross-bending" or "cross-curvature", is generally less pronounced than the former. Usually, the term "cross-bending" is also used to denote the depth of this transverse bending formed by the arc perpendicular to the longest arc. It is equal to the segment whose ends are defined by the middle of the said arc and the middle of the chord corresponding thereto (see the cross-bending DB as represented in FIG. 1).

Figure 11:
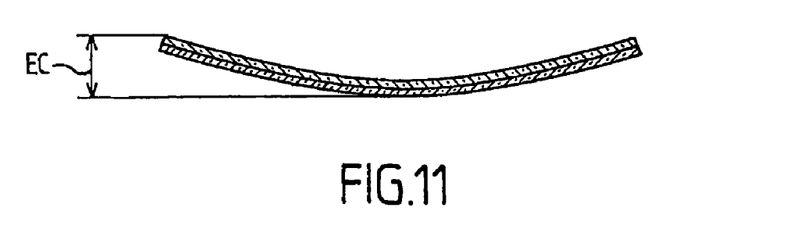

In the following, "central depression" is used to denote the difference in height between the highest point and the lowest point of the glazing element during the bending when it is substantially horizontal. The lowest point of the glazing element is necessarily located in the central region of the glazing element. FIG. 11 represents on a convex glazing element the central depression EC.

The process according to the invention comprises:
- a first stage involving bending of the glazing element through gravitational depression on a first support providing it with a first central depression, then
- a second stage continuing the bending of the glazing element through gravitational depression on a second support, providing it with a second central depression more pronounced than the first and until such time as the whole of the periphery of the glazing element enters into contact with the said second support, the glazing element being at a sufficiently high temperature to enable its central part to continue to sag following contact of the whole of the periphery, then
- a third stage continuing the bending of the glazing element through gravitational depression, providing it with a third central depression more pronounced than the second, the periphery being always in contact with the said second support, then
- a fourth stage halting by cooling the depression of the glazing element and giving it the desired final shape.

The first support and the second support necessarily comprise a peripheral support for entering into contact with the periphery of the glazing element, these peripheral supports being able to be identical or different, and even partially identical and different, according to the embodiments of the invention.

The central depression increases throughout the process according to the invention from the first to the last stage. According to the present invention, the second support is a peripheral support. According to the variants, the first support can be of the peripheral type or both peripheral and inner. The first and the second support can have parts of common lines of contact.

In the following, a distinction is drawn between a peripheral zone and an inner zone of the glazing element to be bent, in that the peripheral zone is that situated at less than 5 cm from the edge of the glazing element, whereas the inner zone is that situated at more than 5 cm from the edge of the glazing element. "Peripheral support" is likewise used to denote a support coming into contact with the glazing element in its peripheral zone and "inner support" is used to denote a support coming into contact with the glazing element, at least in part, in its inner zone. Where a skeleton forms the inner support, generally at least 25% and even at least 50% of the total length of the line of contact with the glazing element is situated in the inner zone. Where a skeleton forms the inner support, generally at least 50% and even preferentially at least 100% of the total length of the line of contact with the glazing element is at less than 10 cm from the edge of said glazing element. Thus, it can be said that during the process of the invention, the inner support does not come into contact with the glazing element at more than 10 cm from the closest edge of the glazing element. It intervene for at least a part of its length (at least 25% and even at least 50% of its length) in the zone (ring) between 5 cm and 10 cm from the edge of the glazing element.

The different supports which can be used according to the invention generally have two longitudinal parts or lines longer than two transverse parts or lines. The two longitudinal parts support the two longest sides of the glazing element, which generally appear substantially horizontal on the equipped vehicles, whereas the two transverse parts support the two shortest sides of the glazing element, which generally appear substantially vertical on the equipped vehicles.

According to an embodiment A, the first support is a peripheral support SP1 and the second support is another peripheral support SP2. These two supports are beneath the peripheral zone of the glazing element. The support SP2 at least partially replaces the support SP1 upon passage from the first to the second stage.

According to a variant A1 of the embodiment A, the support SP2 wholly replaces the support SP1, such that, once this substitution is realized, the glazing element is no longer in contact with any part of SP1. This substitution is effected by relative vertical displacement of one of the peripheral supports in relation to the other. In the first stage SP1 is placed above SP2, and it is vice versa in the second stage.

According to a variant A2 of the embodiment A, the support SP2 partially replaces the support SP1, such that, once this substitution is realized, the glazing element remains in contact with a part of SP1, which also signifies that SP2 comprises a part of SP1. The partial substitution is effected by relative vertical displacement of parts of SP2 in relation to SP1. Generally, it is the lateral parts of SP2 which do not exist in SP1 and which have more accentuated curvatures and are placed in the second stage in working position at a level above the level of the lateral parts of the first support.

According to an embodiment B, the first support comprises a peripheral support SP1 and an inner support SI and the second support comprises a peripheral support SP2. The supports SP1 and SP2 can be identical or different, in which case they are both beneath the peripheral zone of the glazing element. The supports SP1 and SI are both involved in the first stage, but can enter into contact with the glazing element simultaneously or one after the other and they can give up the glazing element (at the end of the first stage) simultaneously or one after the other.

According to a variant B1 of the embodiment B, the support SP2 is the same as the support SP1 and the passage from the first to the second stage results in the support SI retracting in a relative vertical motion in relation to the peripheral support (for example SI travels downwards, the peripheral support remaining at the same height, or, according to another example, SI remains fixed and the peripheral support rises), the glazing element remaining in contact with SP1, this latter undergoing no change of geometry. According to this embodiment, the peripheral support (SP1=SP2) has the peripheral shape of the final glazing element and hence lends the periphery of the glazing element its two peripheral curvatures, that is to say both the peripheral transverse curvature and the peripheral longitudinal curvature. The inner support SI is only involved in the first stage, preventing too great and rapid a depression in the inner zone during the first stage such as to combat the bath effect.

According to a variant B2 of the embodiment B, the support SP2 has the same material elements as SP1 as a contact surface for the glazing element, but the geometry of these material elements has changed between the first and the second stage. SP2 is hence identical to SP1 apart from where it is a case of an articulated support, SP1 corresponding to its least curved shape and SP2 corresponding to its most curved shape. Here, the passage from the first to the second stage results in the vertical displacement of SI downwards relative to SP1/SP2 (it can hence be SP1/SP2 which rises relative to SI, which latter can in this case be fixed) such as to make it lose contact with the glazing element, and in the transformation of SP1 into SP2 by the accentuation of its curvature.

According to a variant B3 of the embodiment B, the support SP2 wholly replaces the support SP1, such that, once this substitution is realized, the glazing element is no longer in contact with any part of SP1. In the second stage, nor is there any longer any contact between the glazing element and the support SI. The passage from the first stage to the second stage hence results in the relative vertical displacement of SI downwards relative to SP2 (it can hence be SP2 which rises relative to SI, which latter can in this case be fixed) such as to make it lose contact with the glazing element, and in the replacement of SP1 by SP2 by a vertical relative motion of the one in relation to the other, SP2 supporting the glazing element and being located above SP1 in the second stage.

According to a variant B4 of the embodiment B, the support SP2 partially replaces the support SP1, such that, once this substitution is realized, the glazing element remains in contact with a part of SP1, which also signifies that SP2 comprises a part of SP1. In the second stage, nor is there any longer any contact between the glazing element and the support SI. The passage from the first stage to the second stage hence results in the vertical displacement of SI downwards relative to SP1/SP2 (it can hence be SP1/SP2 which rises relative to SI, which latter can in this case be fixed) such as to make it lose contact with the glazing element, and in the partial substitution by relative vertical displacement of parts of SP2 in relation to SP1. Generally, it is the lateral parts of SP2 which do not exist in SP1 and which have more accentuated curvatures and are placed in the second stage in working position at a level above the level of the lateral parts of the first support.

According to the invention, any peripheral support is generally a skeleton. According to the invention, any inner support can be a solid shape or a frame, but is preferably a skeleton.

Figure 2:
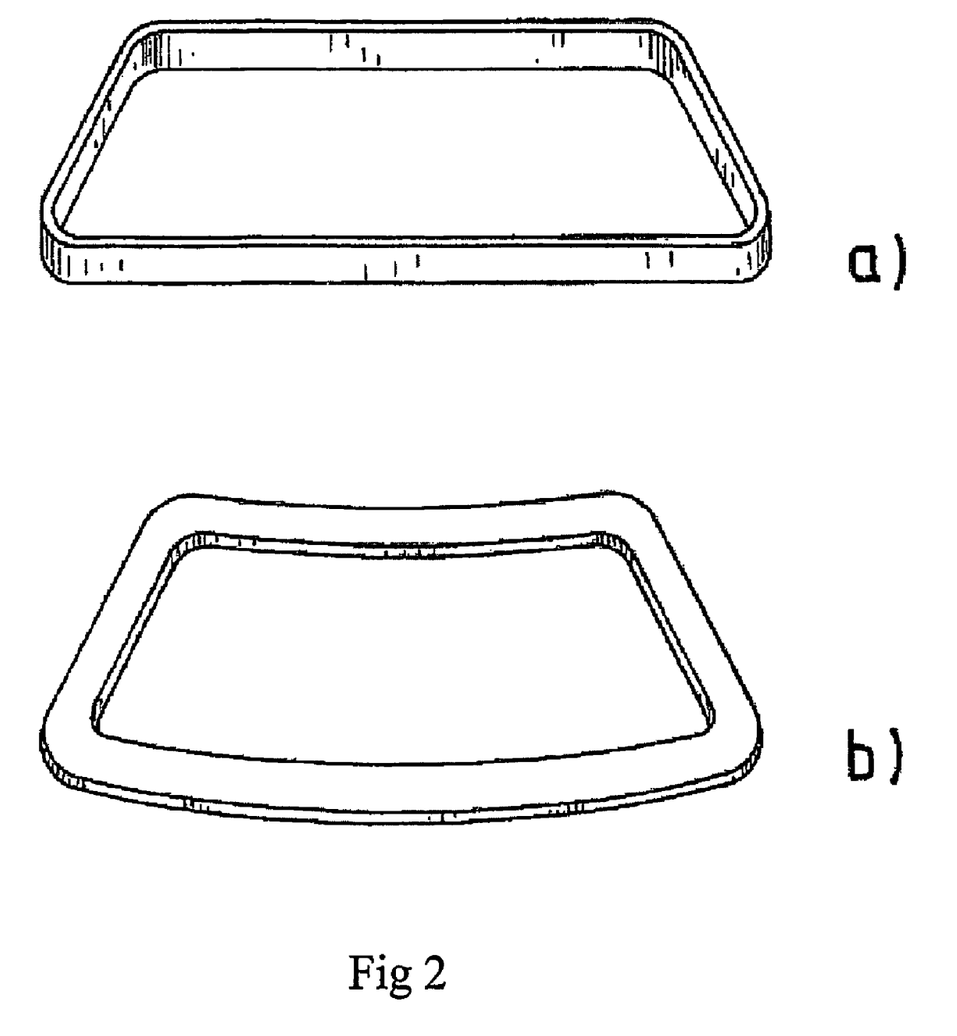

According to the invention, by "skeleton" is meant a fine metal band which can be closed together forming a support on whose upper edge face is placed a sheet of glass (see FIG. 2a).

The edge generally has a thickness ranging from 0.1 to 1 cm. According to the invention, by frame is understood a band likewise capable of closing together, but offering as support not its edge face but one of its large surfaces (see FIG. 2b), the width of which is generally between 1 and 4 cm.

The peripheral supports are generally continuous lines, in particular for the line defining the definitive convex shape of the glazing element, although a line made up of a plurality of points or segments disposed in suitable locations may also be suitable.

For those embodiments of the invention which involve two peripheral supports, the peripheral line corresponding to the first bending stage can be inside or outside the peripheral line corresponding to the second bending stage.

According to the present invention, embodiments are preferred which utilize two peripheral supports offering the periphery of the glazing element two different geometries, the first during the first stage, and the second during the second stage. These two different geometries serve to lend the periphery of the glazing element its shape gradually, such as to prevent counter-bending. These two peripheral supports can be wholly distinct from one another, one being disposed inside the other, the substitution of one support by the other coming about, for example, either by a raising of the level of the second support in relation to the level of the first or by a lowering of the level of the first support, or, indeed, by a combination of these two motions. As a variant, the second peripheral support can be distinct in parts only from the first support. The distinction or difference can relate to the lateral parts of the two lines. In this case, the difference generally consists in the lateral parts of the second support having more accentuated curvatures and being placed in working position at a level above the level of the lateral parts of the first support.

Where two peripheral supports are used according to the present invention, the first being used during the first stage and the second being used during the second stage, the first support generally has throughout a concavity less than or equal to that of the second support at the same place.

For all embodiments of the invention, the first support comprises a peripheral support preferably offering the glazing element a surface quite close to the plane, at least as far as the two longitudinal sides are concerned. The formation of cross-bending is thus promoted during the first stage, in the course of which it is possible to produce very little camber, or even no camber. It is hence preferable to promote cross-bending in the first stage and to realize the bulk of the camber in the second stage. In practice, it is also possible to use in the first stage a peripheral support, all parts of which (lateral and longitudinal) are close to the plane, or even perfectly on the same plane. Generally, the surface of this support only deviates from the perfect plane by less than 3 cm and preferably by less than 2 cm. In all cases it is preferable if the glazing element, from the start of its positioning on this peripheral support forming part of the first support (and prior even to the start of its depression), can adopt the whole of the contour thereof, by virtue both of its flexibility and of the low concavity of the said peripheral support.

Where the peripheral support changes geometry during the passage from the first to the second stage, through partial or total substitution of one peripheral support by another peripheral support, there may locally be a loss of contact of the glazing element with all support at the periphery, a contact over the whole of the periphery being regained a few moments afterwards during the second stage, under the effect of the depression of the glazing element.

Where two peripheral supports are used, the passage from one to the other is preferably realized through constant command of the forces acting upon those parts of the glazing element which come into contact with the second peripheral support, by reaction of this second peripheral support to the contact of the glazing element. In one of the aspects of the invention, the passage between the two peripheral supports is effected by balancing at all times the action of the forces acting upon symmetrical parts of the glazing element coming into contact with the peripheral supports.

In the embodiments involving an inner support, the latter is only involved in the first stage, preventing too great and rapid a depression in the inner zone during the first stage such as to combat the bath effect. The inner support is hence linked to a peripheral support so as to constitute the first support. The final curvatures desired in the inner zone are lent gradually to the glazing element in the course of the stages following the first. Any marks which the inner support has managed to leave on the surface of the glazing element during the first stage disappear during the following stages, since this inner support is no longer in contact with the glazing element. It has thus been established that the depression was even able to be induced during the first stage, such as to provoke locally within the inner zone, through the contact with the inner support, an inverse curvature to that finally desired, without a mark being formed on the final glazing element. At the start of the bending process, the still flat (not yet depressed) sheet of glass enters into contact with the peripheral support of the first support and, where necessary, with the inner support. In the first stage, in fact, the inner support can itself also be very close to the plane (deviation of less than 3 cm and even of less than 2 cm in relation to the plane) and can be situated practically at the same height or slightly below (deviation in height between the peripheral support and the inner support being able to range from 0 mm to 10 mm, especially from 1 to 8 mm) in relation to the peripheral support to which it is linked. According to one variant, the glazing element does not come into contact with the inner support at the start of its contact with the first support and it is only after a certain depression that this contact takes place. The inner support is then withdrawn in the second stage.

The integrality of the process according to the invention can be realized in a furnace in which the supports mounted on trolleys circulate. In particular, a zone can be provided for the actual bending and another zone for homogenization and cooling. The homogenization and cooling zone can be brought, for example, to a temperature around 50 to 120° C. lower than the bending furnace.

From the moment when the periphery of the glazing element is wholly in contact with the last peripheral support, the depression can be left to continue such that the central depression further increases by 1 to 10 mm, and more generally 2 to 8 mm. This progression occurs in the course of the 3rd and 4th stages, until the cooling is sufficient to fix the geometry of the glazing element.

In case of use of an inner support, the temperature of this support is generally higher or equal to the temperature of the peripheral supports, between beginning sagging of the glazing element at the first stage and up to at least the transition from third to fourth stage.

In the case of a laminated glazing element, the cooling preferably proceeds at a rate of 0.5 to 1° C./sec, and yet more preferably is less than 0.8° C./sec.

The first stage generally lasts between 5 and 20 min. The contact time of the glazing element with any inner support is generally at least 1 min less than the duration of the first stage. The second stage generally lasts between 10 and 100 sec. The third stage generally lasts between 5 and 30 sec.

The bending temperature is generally within the range 590 to 670° C. Preferably, a temperature gradient between the centre of the glazing element and its periphery of at least 10° C., for example between 10 and 60° C., is applied, the centre of the glazing element being hotter than the periphery. Such a gradient also combats the bath effect.

The use of an inner support is visible on the final glazing element, since a line of contrast can be distinguished by shadowgraph at the place where the inner support was situated. This place can thus generally also be distinguished by reflection under a grid pattern. Thus, the invention also relates to a laminated glazing element bent in two orthogonal directions, at least one of the sheets of which, under shadowgraph or reflection, has a line in the inner zone.

A glazing element can also be bent by depression on a skeleton provided with an inner support which is not retracted prior to cooling. In this case, a change in the state of stress of the glass at the place where the inner support was present is discernible by the technique of polariscopy, as it is known, or through the use of an epibiascope. In order to implement such a process, a skeleton comprising a peripheral support SP and an inner support SI can, for example, be used, these two supports being fixed one relative to the other. The glazing element is placed on the support SP and, by dint of the depression, the glass proceeds to enter into contact with the support SI. Cooling then ensues, the glazing element being in contact with the two supports SP and SI.

In those embodiments for which the inner support has been retracted prior to the start of cooling, polariscopic methods or the use of an epibiascope do not generally allow detection of the place where the inner support was present.

It is preferable for the inner support to be retracted prior to cooling, especially for particularly convex glazing elements.

Within the scope of the invention, the passage from one support to the other can be rapid or slow. In such a way as to prevent the lateral displacement of the glazing element or its breakage under the effect of an over-sudden change of support, it may be expedient, depending on the case, to seek a gradual and controlled passage from one support to the other.

The passage from one support to the other may be controlled by virtue of a mechanical system passing through the walls of the furnace and coming to rest, in a given place in the furnace, on targets borne by the bending device according to the invention. The resting upon these targets, for example through the use of hydraulic jacks, triggers the passage from one support to the other. Each bending device can comprise, for example, two targets placed on two of its sides.

The supports used within the scope of the invention are preferably lined with an intermediate layer suited to the contact of the hot glass. This intermediate layer can generally be made of a tissue of heat-resistant fibres (non-oxidizing metal, ceramic, etc.). Such an intermediate layer generally equips at least the last support of the glazing element. Where an inner support is used, this is also preferably equipped with such an intermediate layer.

The process according to present invention is particularly suitable for the manufacture of glazing elements having the same type of curvature on all of its points, i.e. overall concave on one side and overall convex on the other side. Thus, the final glazing element shows the same type of curvature on all points of each principal surface.

FIG. 1 shows a glazing element illustrating a camber F and a cross-bending DB, as previously explained above.

FIG. 2a shows a support of a sheet of glass, as previously explained above.

FIG. 2b shows a frame with wider surfaces for support, as previously explained above.

Figure 3:
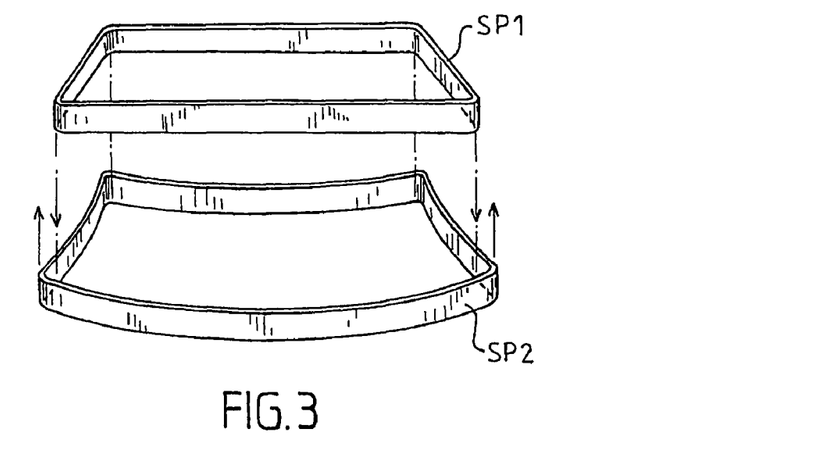

FIG. 3 represents diagrammatically two peripheral supports SP1 and SP2 usable within the scope of the embodiment A1. The arrows represent the vertical relative motion of the two supports during the passage from the first to the second stage. Here, this motion is realized by passage from SP1 to inside SP2. SP2 has been represented with more pronounced curvatures in all places, that is to say both for the transverse lines and the longitudinal lines.

Figure 4:
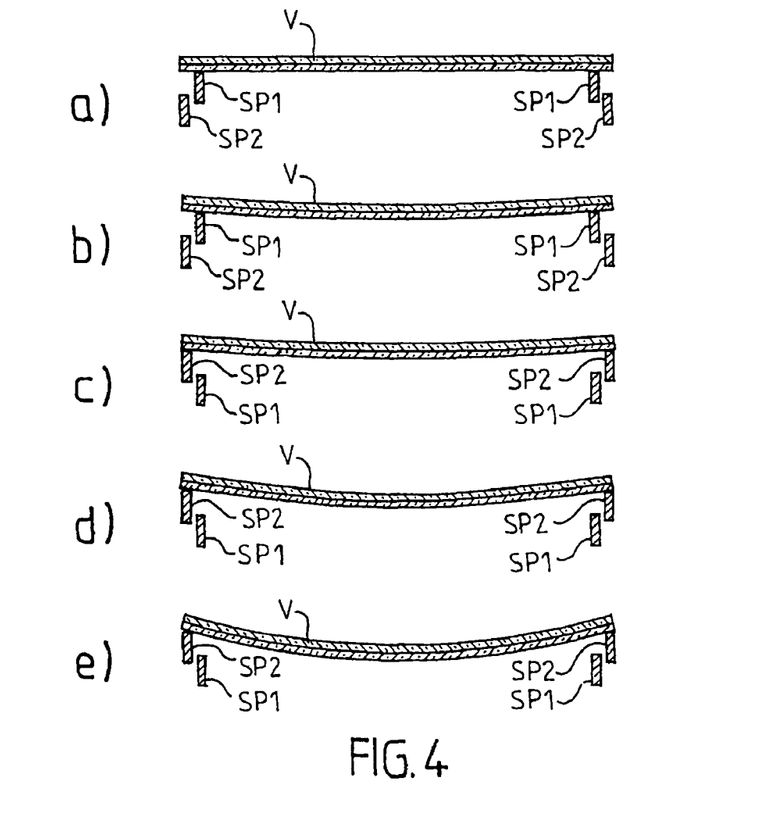

FIG. 4 represents the succession of stages during the realization of the embodiment A1. Two sheets of glass placed one on top of the other rest initially flat on the support SP1 in a). They deepen throughout the gravitational bending process from a) to e). In c), the support SP2 replaces the support SP1. The contour of the glazing element wholly touches the support SP2 in d) and continues to deepen in e).

Figure 5:
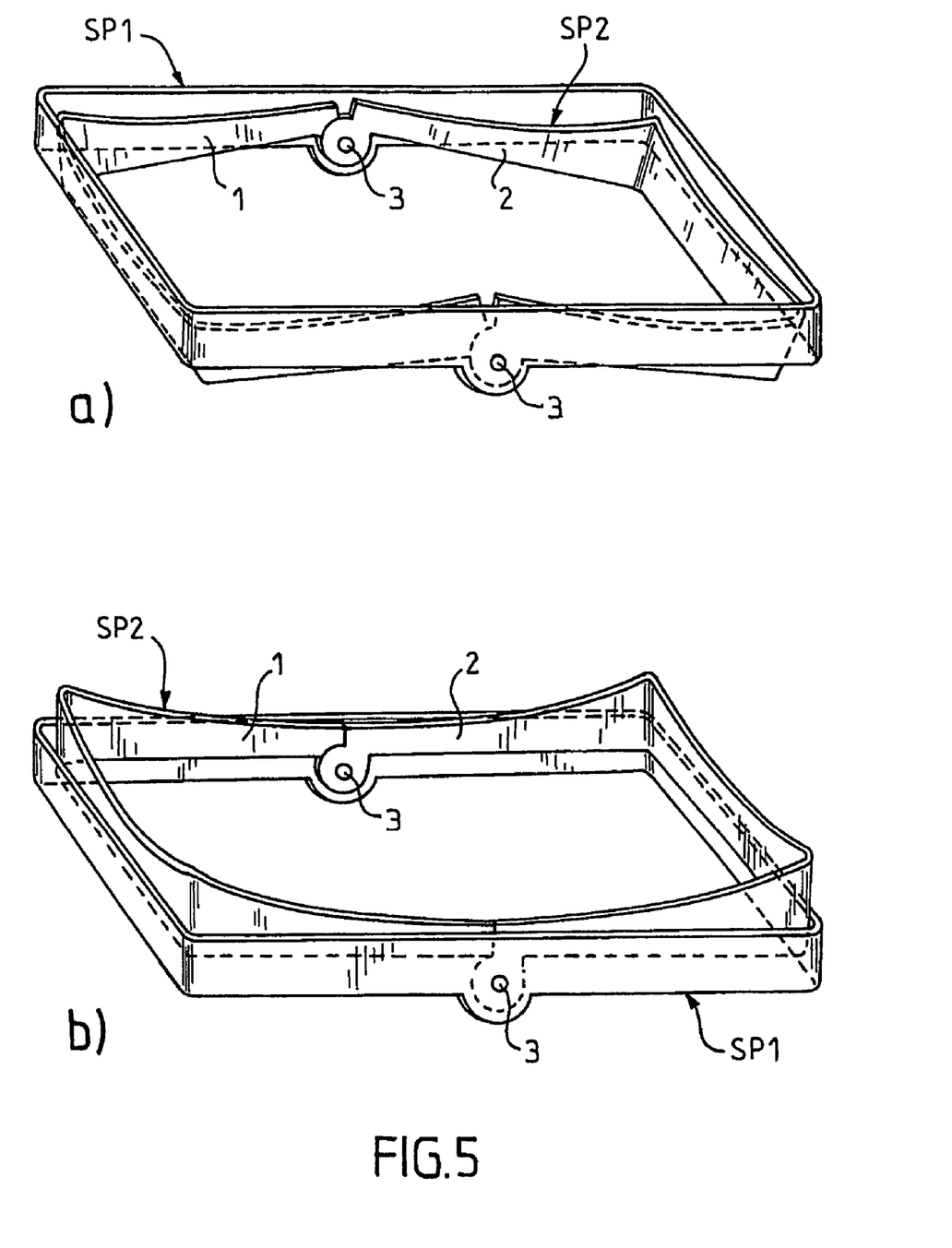

FIG. 5 represents a bending device according to the embodiment A1. This device could be mounted on a wheeled trolley so as to move on rails through a gravitational bending furnace (not represented). This device comprises two bending supports: a first support SP1 and a second support SP2 procuring the definitive bending shape. The latter is here made up of two half-supports 1 and 2, the two symmetrical parts 1 and 2 being mutually connected by the articulations 3. The first support and the two half-supports 1 and 2 forming the definitive support are disposed in such a way that the support SP1 is situated at a higher level during the first bending stage. Thus, in this position, a sheet of glass placed on the first support SP1 does not come into contact with the half-supports 1 and 2. In the bending furnace (not represented) there is provided a transfer station for the sheet of glass pre-bent in the shape of a blank in order to transfer it from the first support SP1 to the second support SP2. The two half-supports 1 and 2 swing simultaneously upwards, whereupon they take over from SP1 in order to support the glazing element. In the working position of the definitive support SP2, the glazing element rests on SP2 and no longer touches SP1.

Figure 6:
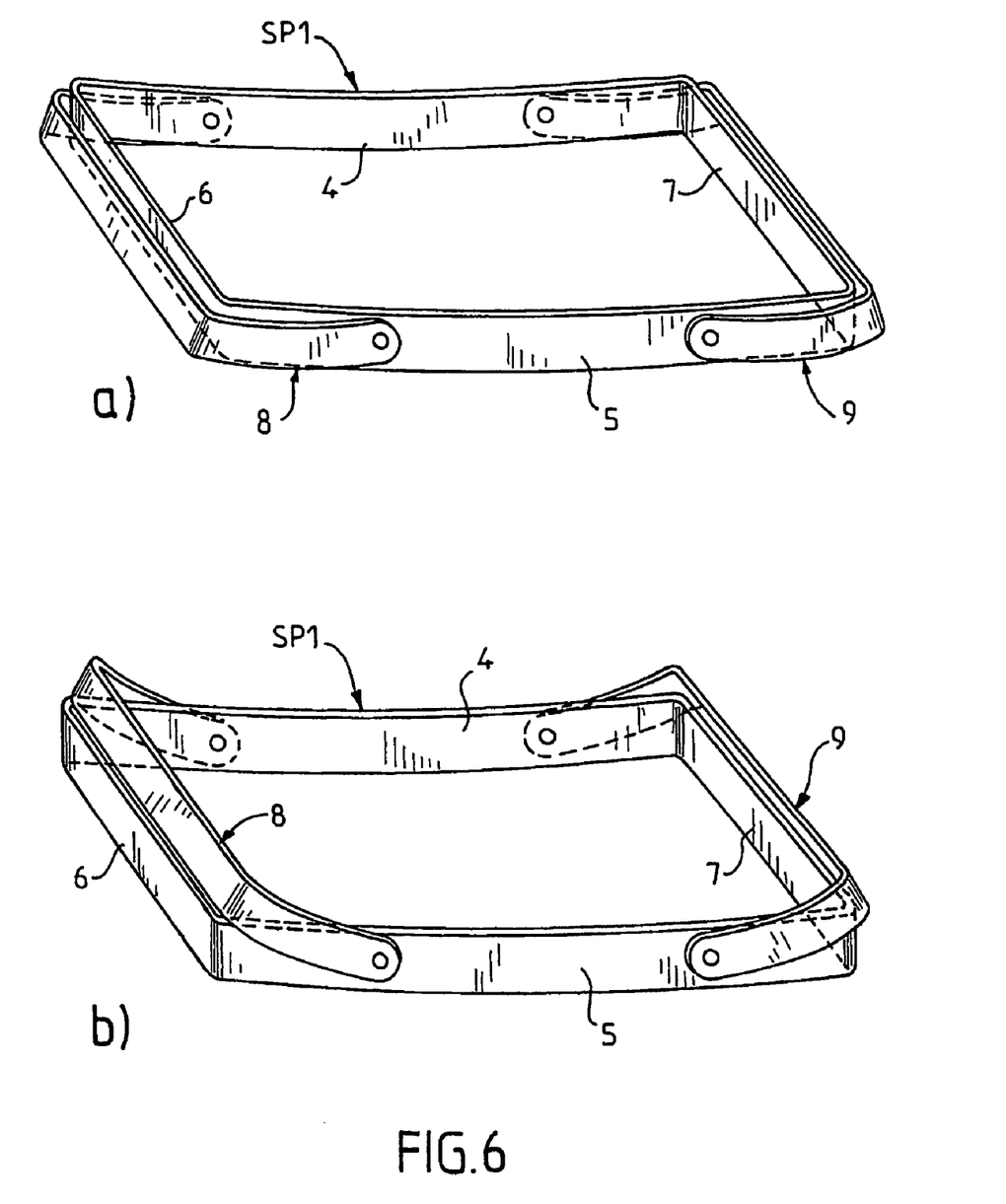

In FIG. 6, a device of the type A2 has been represented, comprising a fixed support SP1. This fixed support can be mounted on a trolley (not represented) such as to be able to convey it through a bending furnace. This fixed support SP1 is made up of two longitudinal parts 4 and 5 and two transverse parts 6 and 7. The support SP2 involved in the second stage (FIG. 6b) comprises a part of the support SP1, namely partially the two longitudinal parts 4 and 5, and two transverse parts 8 and 9 which are mounted pivotably about horizontal axes. The glazing element is placed horizontally on the fixed frame when the device is in the position according to FIG. 6 a). The first bending stage procuring the first shape takes place on the fixed frame. The second bending stage procuring the definitive shape is effected when the device is in the configuration according to FIG. 6 b).

Figure 7:
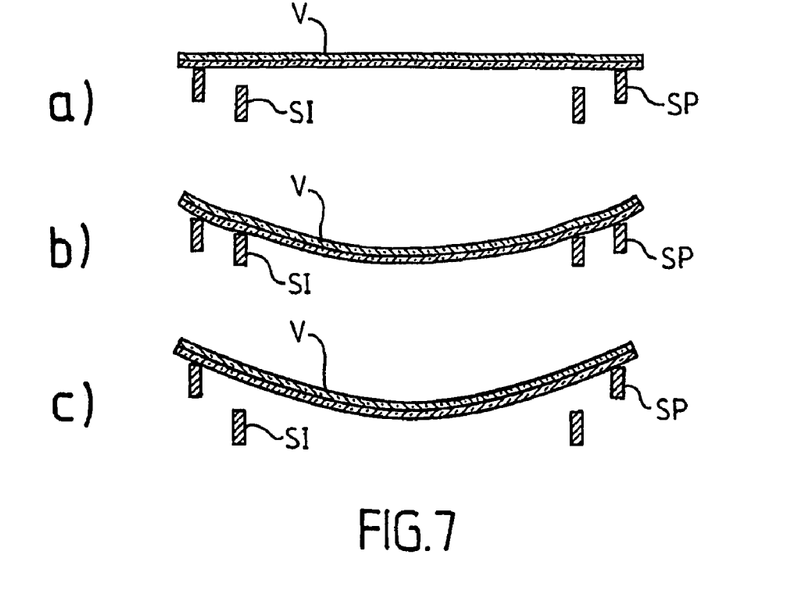

FIG. 7 represents the sequences of the embodiment B1 for which the first support comprises both a fixed peripheral support SP (invariable geometry) and an inner support SI and the second support only comprises a peripheral support SP totally identical to the peripheral support of the first support. When the glazing element v (here two sheets of glass placed one on top of the other) is placed on the first support, it initially only touches the peripheral support in a), then sags and touches the inner support SI, which prevents an excessive depression and even provokes a slight inversion of concavity locally in b) in FIG. 7. For the second stage, the inner support is retracted downwards relative to SP and is no longer in contact with the glazing element. The latter continues to bend.

Figure 8:
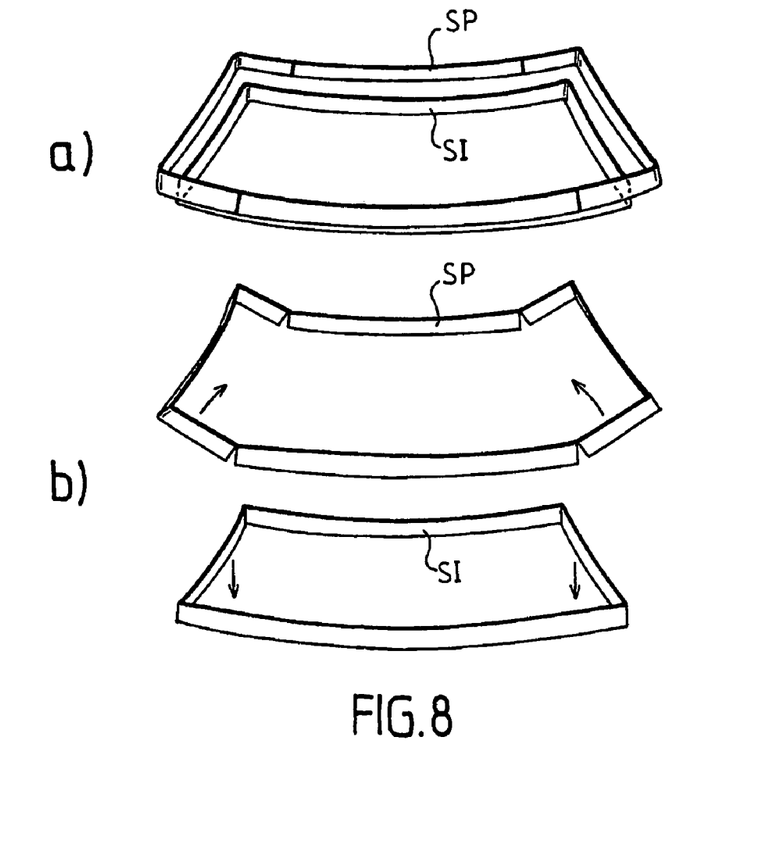

FIG. 8 represents sequences of the embodiment B2 for which the first support comprises both a peripheral support SP and an inner support SI and the second support only comprises a peripheral support SP constituted by the same material elements as the peripheral support of the first support, but with a different geometry. The support SP is here an articulated skeleton, opened out in the first stage (FIG. 8a) and folded up in the second stage (FIG. 8b). During the first stage, when the glazing element is placed (flat) on the first support, it initially only touches the peripheral support in the opened-out state, then sags and touches the inner support SI, which prevents an excessive depression and can even provoke a slight inversion of concavity locally, as in the previous embodiment. For the second stage, the inner support is retracted downwards relative to SP and is no longer in contact with the glazing element, and the lateral arms of the support SP are folded up, imposing a greater bending upon the glazing element, which continues, moreover, to bend in its central part.

Figure 9:
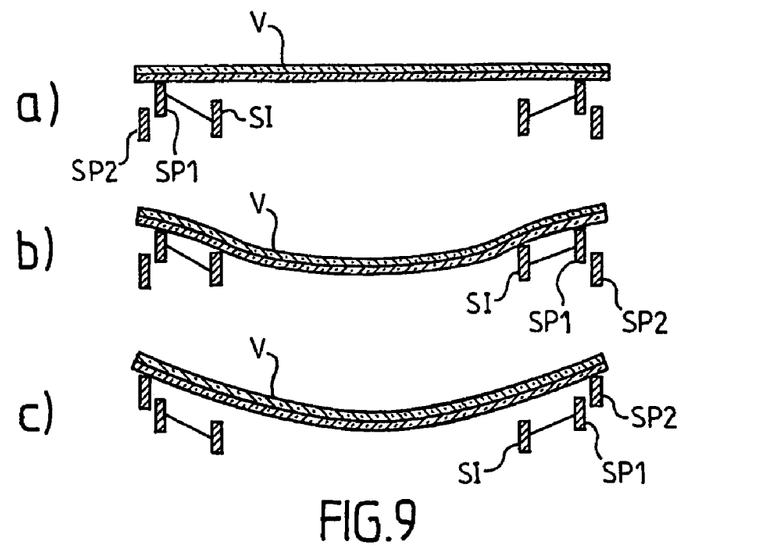
Figure 10:
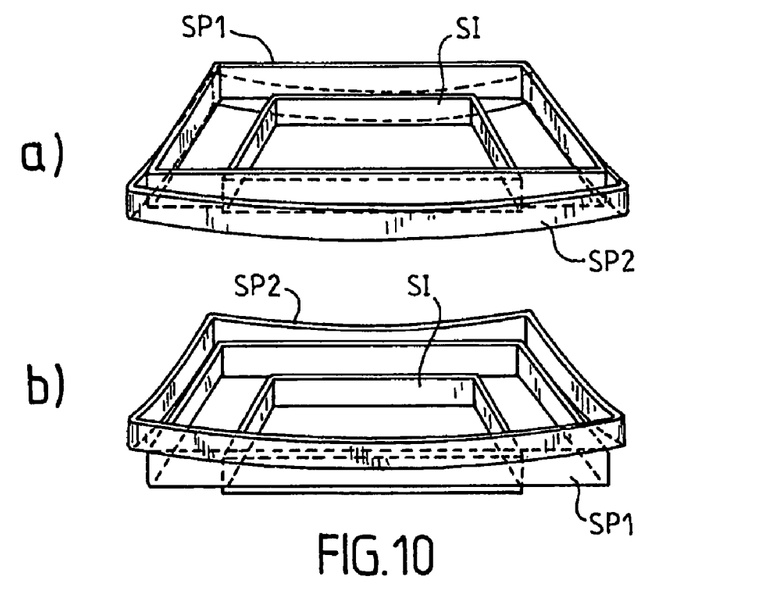

FIGS. 9 and 10 represent sequences of the embodiment B3 for which the first support comprises both a peripheral support SP1 and an inner support SI and the second support only comprises a peripheral support SP2. The supports SP1 and SI are coupled together (connection not represented in FIG. 10), SI being situated a little lower than SP1. Initially when the glazing element is put in place, it only touches the peripheral support SP1 (FIG. 9a). Bending under the force of gravity, it then proceeds to touch SI, which prevents an excessive depression and can even provoke a slight inversion of concavity locally, as in the two previous embodiments (FIG. 9b). For the second stage, the first support is retracted downwards (arrows in FIG. 10 b) relative to SP2 both for the peripheral support SP1 and the inner support SI, and the glazing element only remains resting upon the peripheral support SP2 (FIG. 9c). The glazing element assumes the peripheral shape of SP2 and continues to sag in its central region (stages 3 and 4).

FIG. 11 represents on a convex glazing element the central depression EC as previously explained above.

The invention claimed is:

1. A process for bending a glass panel, comprising:
a first step of bending the glass panel by making said glass panel sag under gravity on a first support, giving said glass panel a first central sag; then
a second step that continues the bending and that includes contacting said glass panel to a second support thereby bending the glass panel by sagging under gravity, on said second support, giving said glass panel a second central sag more pronounced than the first central sag and until the entire periphery of the glass panel comes into contact with the second support,
a third step that continues the bending and that includes maintaining the glass panel on the second support at a sagging temperature high enough for the central part of the glass panel to continue to sag after contact of the entire periphery of the glass panel with the second support, wherein during said maintaining the glass panel continues to bend by sagging under gravity, giving said glass panel a third central sag more pronounced than the second central sag, the entire periphery of the glass panel still being in contact with the second support; and then
a fourth step that includes stopping the sagging of the glass panel by cooling the glass panel, giving the glass panel a desired final shape,
wherein the first support comprises a first peripheral support that supports said glass panel during said first step at said periphery of said glass panel and the second support comprises a second peripheral support that supports said glass panel during said second step at said periphery of said glass panel, the second peripheral support having at least partially a concavity greater than that of the first peripheral support, wherein said second peripheral support is a skeleton support, and
wherein the first support further comprises an internal support that contacts said glass panel during said first step at more than 5 cm from the periphery of the glass panel, and wherein said internal support no longer contacts said glass panel during said third step.

2. The process as claimed in claim 1, wherein the second peripheral support has at all points a concavity greater than that of the first peripheral support.

3. The process as claimed in claim 1, wherein the first and second peripheral supports are completely separate.

4. The process as claimed in claim 1, wherein the internal support is at a same height as the first peripheral support or below the first peripheral support by an amount of up to 10 mm.

5. The process as claimed in claim 1, wherein during the bending the glass panel comes firstly into contact with the first peripheral support and then, after a certain sag, with the internal support.

6. The process as claimed in claim 1, wherein the internal support causes, locally and momentarily, a concavity that is an inverse of a final concavity of the glass panel at the same point.

7. The process as claimed in claim 1, wherein the internal support is moved away from the glass panel before the cooling.

8. The process as claimed in claim 7, wherein the internal support is not in contact with the glass panel after the first step.

9. The process as claimed in claim 1, wherein the internal support does not come into contact with the glass panel over more than 10 cm from a closest edge.

10. The process as claimed in claim 1, wherein the internal support comes into play, at least for part of its length, in a region lying between 5 cm and 10 cm from an edge of the glass panel.

11. The process as claimed in claim 1, wherein the internal support is a skeleton.

12. The process as claimed in claim 1, wherein an entire peripheral support is a skeleton.

13. The process as claimed in claim 1, wherein the central sag increases from 1 to 10 mm after said second step.

14. The process as claimed in claim 1, wherein the final glass panel has, on each of its main surfaces, a same type of concavity at every point.

15. The process as claimed in claim 1, wherein said third step lasts between 5 and 30 seconds.

16. The process as claimed in claim 1, wherein said sagging temperature is between 590 to 670° C.

17. The process as claimed in claim 16, further comprising applying a temperature gradient between the central part of said glass panel and the periphery of the glass panel during said third step.

18. The process as claimed in claim 17, wherein said temperature gradient is at least 10° C.

19. The process as claimed in claim 17, wherein said temperature gradient is between 10 and 60° C.

20. The process as claimed in claim 1, wherein said third step is performed such that the third central sag forms a central depression of said glass panel and said central depression increases by 1 to 10 mm during said maintaining of the glass panel on the second support at the sagging temperature, said central depression being defined as the difference in height between a highest point and a lowest point of the glass panel when said glass panel is substantially horizontal.

21. The process as claimed in claim 20, wherein said third step is performed such that the central depression of said glass panel increases by 2 to 8 mm during said maintaining of the glass panel on the second support at the sagging temperature.

22. The process as claimed in claim 1, wherein said first support forms a mark on said glass panel during said bending of the glass panel with said first support, and wherein said mark is at least partially erased by said third step.

23. The process as claimed in claim 1, wherein said bending during said first, second and third steps results only from a gravitational force on said glass panel.

24. A process for bending a glass panel, comprising:
a first step of bending the glass panel by making said glass panel sag under gravity on a first support, giving said glass panel a first central sag; then
a second step that includes contacting said glass panel to a second support and that continues the bending of said glass panel by sagging under gravity on said second support giving said glass panel a second central sag more pronounced than the first one and until the entire periphery of the glass panel comes into contact with said second support, the glass panel being at a temperature high enough for its central part to be able to continue to sag after contact of its entire periphery; then
a third step that includes maintaining the glass panel on said second support, the periphery of said glass panel still being in contact with said second support, and that continues the bending of the glass panel by sagging under gravity, giving said glass panel a third central sag more pronounced than the second; and then
a fourth step that includes stopping the sagging of said glass panel by cooling the said glass panel, giving said glass panel a desired final shape,
wherein the first support comprises a first peripheral support that supports said glass panel during said first step at said periphery of said glass panel and the second support comprises a second peripheral support that supports said glass panel during said second step at said periphery of said glass panel, wherein said second peripheral support is a skeleton support, and
wherein the first support further comprises an internal support that contacts said glass panel during said first step at more than 5 cm from the periphery of the glass panel, and wherein said internal support no longer contacts said glass panel during said third step.

25. A process for bending a glass panel, comprising:
a first step of bending the glass panel by making said glass panel sag under gravity on a first support, giving said glass panel a first central sag; then
a second step that continues the bending and that includes contacting said glass panel to a second support thereby bending the glass panel by sagging under gravity, on said second support, giving said glass panel a second central sag more pronounced than the first central sag and until the entire periphery of the glass panel comes into contact with the second support, wherein said second support is a skeleton support,
a third step that continues the bending and that includes maintaining the glass panel on the second support at a sagging temperature high enough for the central part of the glass panel to continue to sag after contact of the entire periphery of the glass panel with the second support, wherein during said maintaining the glass panel continues to bend by sagging under gravity, giving said glass panel a third central sag more pronounced than the second central sag, the entire periphery of the glass panel still being in contact with the second support, applying a temperature gradient between the central part of said glass panel and the periphery of the glass panel during said third step; and then
a fourth step that includes stopping the sagging of the glass panel by cooling the glass panel, giving the glass panel a desired final shape.

26. The process as claimed in claim 25, wherein said temperature gradient is at least 10° C.

27. The process as claimed in claim 26, wherein said temperature gradient is between 10 and 60° C.

28. A process for bending a glass panel, comprising:
a first step of bending the glass panel by making said glass panel sag under gravity on a first support, giving said glass panel a first central sag; then
a second step that continues the bending and that includes contacting said glass panel to a second support thereby bending the glass panel by sagging under gravity, on said second support, giving said glass panel a second central sag more pronounced than the first central sag and until the entire periphery of the glass panel comes into contact with the second support,
a third step that continues the bending and that includes maintaining the glass panel on the second support at a sagging temperature high enough for the central part of the glass panel to continue to sag after contact of the entire periphery of the glass panel with the second support, wherein during said maintaining the glass panel continues to bend by sagging under gravity, giving said glass panel a third central sag more pronounced than the second central sag, the entire periphery of the glass panel still being in contact with the second support; and then
a fourth step that includes stopping the sagging of the glass panel by cooling the glass panel, giving the glass panel a desired final shape,
wherein the first support comprises a first peripheral support that supports said glass panel during said first step at said periphery of said glass panel and the second support comprises a second peripheral support that supports said glass panel during said second step at said periphery of said glass panel, the second peripheral support having at least partially a concavity greater than that of the first peripheral support, and
wherein the first support further comprises an internal support that contacts said glass panel during said first step at more than 5 cm from the periphery of the glass panel, and wherein said internal support no longer contacts said glass panel during said third step,
wherein said bending during said first, second and third steps results only from a gravitational force on said glass panel
wherein said third central sag is free of contact with said second support during said third step and between said third step and said forth step.

29. A process for bending a glass panel, comprising:
a first step of bending the glass panel by making said glass panel sag under gravity on a first support, giving said glass panel a first central sag; then
a second step that continues the bending and that includes contacting said glass panel to a second support thereby bending the glass panel by sagging under gravity, on said second support, giving said glass panel a second central sag more pronounced than the first central sag and until the entire periphery of the glass panel comes into contact with the second support,
a third step that continues the bending and that includes maintaining the glass panel on the second support at a sagging temperature high enough for the central part of the glass panel to continue to sag after contact of the entire periphery of the glass panel with the second support, wherein during said maintaining the glass panel continues to bend by sagging under gravity, giving said glass panel a third central sag more pronounced than the second central sag, the entire periphery of the glass panel still being in contact with the second support; and then a fourth step that includes stopping the sagging of the glass panel by cooling the glass panel, giving the glass panel a desired final shape, wherein the first support comprises a first peripheral support that supports said glass panel during said first step at said periphery of said glass panel and the second support comprises a second peripheral support that supports said glass panel during said second step at said periphery of said glass panel, the second peripheral support having at least partially a concavity greater than that of the first peripheral support, and wherein the first support further comprises an internal support that contacts said glass panel during said first step at more than 5 cm from the periphery of the glass panel, and wherein said internal support no longer contacts said glass panel during said third step, wherein said bending during said first, second and third steps results only from a gravitational force on said glass panel wherein said third central sag is free of contact with any structure during said third step and between said third step and said forth step.

* * * * *